INVENTORS.
GUNTER ZWEIG
ROBERT E. PIPHER
JOAN E. HITT

BY Bruns and Jenney
Att'ys.

United States Patent Office 3,504,185
Patented Mar. 31, 1970

3,504,185
APPARATUS FOR MEASURING AND CONTROLLING CELL POPULATION DENSITY IN A LIQUID MEDIUM
Gunter Zweig, Syracuse, Robert E. Pipher, Cortland, and Joan E. Hitt, Syracuse, N.Y., assignors to Syracuse University Research Corporation, Syracuse, N.Y., a corporation of New York
Filed May 9, 1968, Ser. No. 727,910
Int. Cl. G01n 21/26
U.S. Cl. 250—218    5 Claims

ABSTRACT OF THE DISCLOSURE

A glass chamber for cell growth in a liquid medium has means for adding medium controlled by a solenoid valve. One photocell faces a light source through the medium and another photocell faces the source directly. The photocells are connected with resistances in a Wheatstone bridge whose midpoints are connected to a voltage comparator whose output operates the valve for diluting the medium when cell growth causes increased turbidity in the chamber and changes voltage in the bridge. A strip chart recorder potentiometer connected across the bridge records changes in voltage in the bridge.

BACKGROUND OF THE INVENTION

This invention relates to the growth of single cell organisms in a liquid medium and more particularly to a device for measuring such growth and for controlling the cell density in the medium.

In growing single cell organisms, such as algae, bacteria, mold and yeast, in a liquid medium difficulty has been experienced in that, as the medium becomes more densely populated, a point is reached where the rate of growth is slowed because the medium is too densely populated. Usually there is an optimum population density, or a range of densities, where the cell reproduction is fastest.

As the medium becomes more densely populated, it becomes more turbid or opaque so that attempts have been made to measure the density by optical means so that the optimum density may be obtained by adding more medium to dilute the populated or cultured medium in which growth takes place. Such optical equipment has been expensive and continuous attention to the measurement and addition of fresh medium is necessary.

SUMMARY OF THE INVENTION

The present invention provides means for continuously electrically scanning the cultured medium by means of a photoelectric cell and measuring the voltage of this photocell. In order to obtain the measurement a second matching photocell, in constant direct view of the same light source is used together with two resistances connected in the well known Wheatstone bridge, one resistance being variable so that the range of the bridge may be adjusted. A strip chart recorder may be used to record the measurement, the potentiometer which operates the stylus of the recorder being connected in conventional manner to the balance point of the bridge.

Furthermore, a known type of voltage comparator is also connected to the balance points of the bridge and the output of the comparator is energized by changes in voltage of the scanning photocell in the bridge. As cell population density increases the turbidity of the medium increases resulting in increased resistance and lower voltage in the scanning cell as compared to the non-scanning cell.

Automatic control of the cell density is accomplished by using the output of the comparator for operating a switch arrangement which opens a valve to admit fresh medium to dilute the cultured medium until the cultured medium becomes less turbid again and the output of the comparator is no longer energized so that the switch is no longer operated and the valve is shut off.

A constant fluid level is maintained in the chamber in which the cultured medium is contained and the overflow resulting from dilution is collected for use. Usually continual agitation of the fluid in the chamber is required to keep the cells in suspension in the medium and physical conditions which are necessary for optimum growth speed are maintained in the usual manner.

DESCRIPTION OF THE PREFERRED EMBODIMENT

Figure 1:
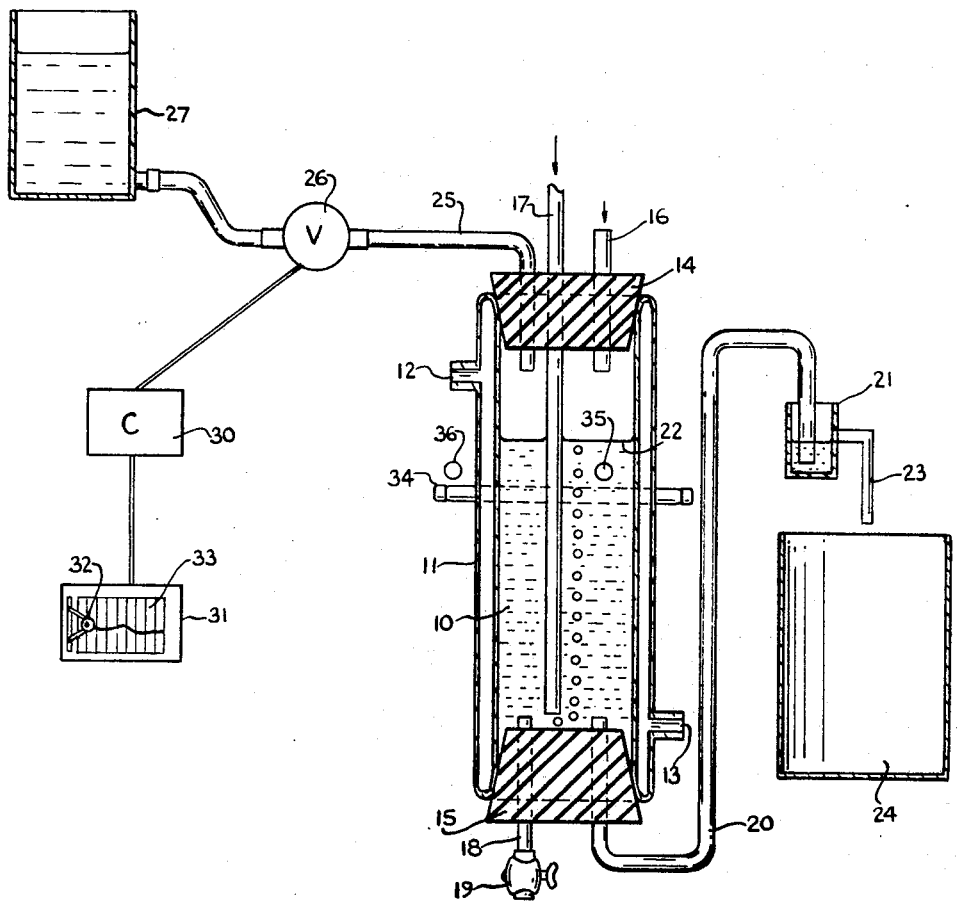
FIGURE 1 is a diagrammatic view of the culture chamber and associated apparatus of the invention.

Referring to FIGURE 1, a growth chamber 10 has a glass sidewall 11 in the form of a water jacket with entrance 12 and exit 13 through which water is constantly pumped, the water being maintained at a chosen constant temperature by conventional means not shown. The chamber is stoppered at top 14 and bottom 15, as shown, the top of the chamber being vented to atmosphere by the tube 16.

Chamber 10 contains a liquid medium, usually nutrient, containing organic and inorganic salts and other substances and a population of living cells such as algae, bacteria, mold or animal cells in suspension in the medium and capable of growth therein. A tube 17 leading from a source, not shown, through the top 14 extends substantially to the bottom of the chamber for supplying gas which bubbles up through the medium. Nitrogen, oxygen, or carbon dioxide or a mixture may be used and one or more of the gases may be necessary for cell growth. The continuous stream of bubbles from tube 17 agitates the cultured medium to keep the cell population in suspension. Alternatively or additionally, a mechanical agitating device may be used.

A sampling tube 18 with shut off valve 19 is provided through the bottom 15 and another tube 20 through the bottom leads to a constant level overflow device 21 for maintaining the medium in the chamber 10 at a chosen level 22. The drain 23 from the constant level device carries the withdrawn cultured medium to a collecting tank 24.

Another tube 25 through the top 14 is led through a normally closed solenoid operated valve 26 from a reservoir tank 27 of fresh uncultured liquid medium for diluting the cultured medium in chamber 10 when the cell population in the chamber rises above a chosen population density. All of the above described apparatus is kept uncontaminated as by autoclaving before assembly.

Valve 26 is operated by a control circuit 30 which includes a moving strip chart recorder 31 having a potentiometer-operated stylus 32 for marking the strip chart 33.

A source of light 34 is located adjacent the chamber 10 and two matched photo-electric cells 35 and 36 are connected in the circuit 30. The light source 34 may be of the fluorescent type required for the growth of certain photo-synthetic cells but, in any event, is located on one side of chamber 10 while the photocell 35 is located on the other side of the chamber for receiving light from the source through the cultured medium in the chamber. Care is taken to install the photocell 35 so that gas bubbles from the tube 17 do not pass between the photocell and the light source.

The second photocell 36 is located, preferably substantially equidistantly from the light source 34, for receiving light directly from the source as indicated diagrammatically in FIGURE 1.

Figure 2:
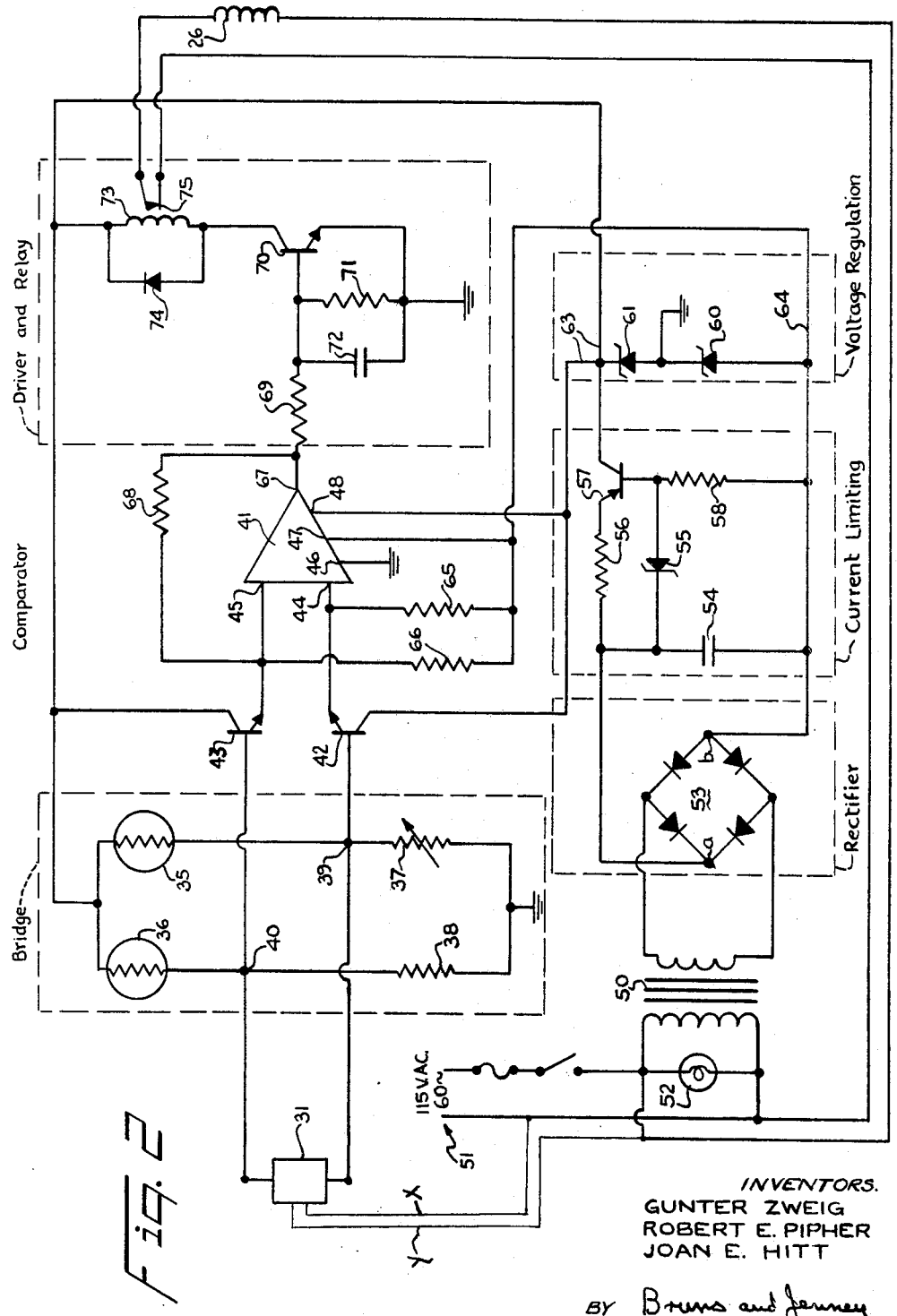
FIGURE 2 is a circuit diagram of the electrical control portions of the apparatus of FIGURE 1.

Referring now to FIGURE 2, photo-electric cells 35 and 36 are wired in a Wheatstone bridge arrangement with resistors 37 and 38, resistor 37 being variable and in the form of a ten-turn potentiometer for controlling the balance point of the bridge.

The midpoints 39 and 40 of the Wheatstone bridge are connected to the respective terminals of the recorder potentiometer and are also each connected through a NPN transistor to a respective input terminal of a commercially available high-speed differential voltage comparator 41. Point 39 between photocell 35 and resistor 37 is connected to the base of transistor 42 and point 40 between photocell 36 and resistor 38 is connected to the base of transistor 43. The emitter of transistor 42 is connected as an emitter follower to the inverting input 44 of the comparator and the emitter of transistor 43, also as a follower, to the non-inverting input 45.

The integrated circuit comparator 41 is available as model $\mu$A710C of the Semiconductor Division of the Fairchild Camera and Instrument Corporation and has a terminal 46 which is grounded and terminals 47 and 48 adapted to be connected to about —6 volts and about +12 volts respectively.

The power source for the bridge and comparator is a transformer 50 whose primary winding is connected to an ordinary house current line source at 51 through the usual switch and fuse. An indicator lamp 52 may be connected across the primary. The same source at 51 may be connected by lines $x$ and $y$ to recorder 31 for powering its chart motor.

The secondary of transformer 50 is connected to the input terminals of a diode bridge rectifier 53 whose output terminals $a$ and $b$ are connected to a respective plate of a capacitor in a current limiting arrangement featuring a Zener diode 55. Output terminal $a$ of rectifier 53 is also connected through a resistor 56 to the emitter of an PNP transistor 57 whose base is connected through the anode and cathode of Zener diode 55 to the junction of terminal $a$ and capacitor 54, the base being also connected through another resistor 58 to the other output terminal $b$ of the rectifier.

This latter output terminal $b$ is also connected to a voltage regulation arrangement comprising two Zener diodes 60 and 61 in series in the order of anode-cathode, anode-cathode, the cathode of the latter Zener diode being connected to the collector of transistor 57. The junction of the cathode of diode 60 and the anode of diode 61 is connected to ground.

The junction of the cathode of Zener diode 61 and the collector of transistor 57 supplies a positive 12.6 volts and is connected by a line 63 to the terminal 48 of the comparator, to the collectors of transistors 42 and 43 and to one input point of the Wheatstone bridge arrangement, the other bridge input point being grounded.

The junction of the connection of output terminal $b$ with the anode of Zener diode 60 supplies a negative 6 volts to a line 64 which is connected to terminal 47 of the comparator and to the input terminals 44 and 45 through resistors 65 and 66, respectively.

The output 67 of the comparator is connected through a high resistance 68 to the non-inverting input 45 to provide a small amount of feedback.

The comparator output 67 is also connected through a resistor 69 to the base of a switch or driver NPN transistor 70, the junction of resistor 69 and the base being connected to ground through a resistor 71. A capacitor 72 is connected between this same junction and ground in parallel with resistor 71. The emitter of transistor 70 is also connected to ground. The collector of transistor 70 is connected to one terminal of the coil of a relay 73 and to the anode of a diode 74. The other terminal of coil 73 is connected to the cathode of diode 74 and to line 63.

The normally closed contacts 75, 75 or relay 73 normally complete a circuit from the line terminals at 51 through the solenoid of valve 26 so that the valve is normally held closed by the solenoid.

In operation the comparator 41 may be disconnected from the Wheatstone bridge arrangement or rendered inoperative by a suitable switch in the driver arrangement. Recorder 31 then operates to graph the increasing turbidity of the cultured medium in chamber 10 as the cells of the culture multiply.

The variable resistance 37 is set at a value to bring the balance points 39 and 40 into approximate equality. As the resistance of photo-electric cell 35 changes due to the increasing turbidity of the medium in chamber 10 the voltage difference between the balance points 39 and 40 is recorded by the voltage sensitive recorder.

When the turbidity of the medium reaches a level which indicates the desired cell density, as indicated by the recorder or as indicated by samplings withdrawn through tube 18, the comparator 41 may be reconnected or switched on and variable resistor 37 may then be again set so that midpoint 39 is positive with respect to, but near to, the voltage of midpoint 40, to start the operation of valve 26 by means of the comparator 41.

Whenever the turbidity of the cultured medium in chamber 10 increases, as sensed by an increase in resistance in photocell 35, relay 73 is operated, as hereinafter described, valve 26 opens and fresh medium from reservoir 27 flows into chamber 10 diluting the cultured medium and reducing the turbidity. An equal amount of cultured medium is automatically withdrawn from the bottom of chamber 10 through the constant level device 21 and the overflow from device 21 is collected in the tank 24.

As indicated above, the comparator 41 is a known device and has maximum ratings of supply voltage of +14 and —7 with optimum operating voltages of about +12 and —6 volts. The rectifier, current-limiter, voltage regulation arrangement described above supplies a +12.6 voltage at terminal 48 and a —6 volts at terminal 47.

The state of output 67 of the comparator is controlled by the voltage relationship of inverting input 44 and non-inverting input 45. When input 44 is more positive than input 45 the output 67 is approximately zero volts. When input 44 is less positive than input 45 the output is approximately +3 volts.

When the variable resistance 37 is first set, the balance point 39 is positive with respect to point 40. As the turbidity in chamber 10 increases, the resistance of photocell 35 increases, decreasing the voltage difference between points 39 and 40. Continuing increase in turbidity causes point 40 to become positive with respect to point 39. This condition is coupled through emitter followers 42 and 43 to the inputs 44 and 45. Hence, input 44 is now negative with respect to input 45 and the output 67, as described above, changes from 0 to +3 volts.

The emitter follower arrangement of the transistors 42 and 43 between the midpoints 39 and 40 of the Wheatstone bridge and the inputs 44 and 45 of the comparator isolates the bridge and comparator.

The feedback through resistance 68 ensures that positive switching occurs at the threshold point of the sensing by the Wheatstone bridge arrangement that excessive turbidity exists in the chamber 10. The feedback is kept small to minimize the hysteresis effect that it produces.

The plus 3 volts at output 67 is communicated through resistor 69 to the base of transistor 70 causing forward bias in the transistor. The transistor being connected between ground and through relay coil 73 to line 63 at +12.6 volts, its forward biased condition causes transistor 70 to draw heavily through coil 73 to operate the relay. As relay 73 is operated, its contacts 75 are separated, opening valve 26.

As fresh medium is admitted to chamber 10 the turbidity is reduced and the resistance of photocell 35 decreases until balance point 39 becomes positive again with respect 40. At that time input 44 becomes positive with respect to input 45 and output 67 again becomes zero. Transistor 70 is thereby switched off and relay 73 returns to normal, closing valve 26.

After each opening and closing of valve 26 and consequent dilution of the contents of chamber 10, the Wheatstone bridge arrangement continues sensing until subsequent increased turbidity causes another opening of the valve. Thus it will be seen that means have been provided for maintaining the cell density at a substantially constant level.

Since the potentiometer of recorder 31 remains connected in the circuit 30, a continuous record of additions of the medium through valve 26 is maintained.

Comparator 41 does not require highly regulated supply voltages and the parallel arrangement of the resistances in the bridge is likewise relatively immune to voltage fluctuations so that simple Zener regulation of the voltages to the control circuitry by the Zener diodes 60 and 61 is sufficient.

The arrangement of capacitor 54, Zener diode 55, resistances 56 and 58, and transistor 57, of course, provides means for limiting the current supplied to the control circuitry and also provides means for protecting the power supply components, transformer 50, rectifier 53 and Zeners 60 and 61.

A constructed embodiment of the invention was successfully operated using the following circuit components, listed by way of example only:

Comparator 41—Fairchild "A710C
Photocells 35 and 36—Clairex Cdse #CL904
Resistors 69, 71, 58, 38 and potentiometer 37—1K
Resistor 68—510K
Resistors 65 and 66—15K
Resistor 56—100 ohms
Recorder—High point impedence, potentiometer type, strip chart recorder with balanced input capabilities and minimum sensitivity of 100 mv. full scale deflection.
Transistors 42, 43 and 70—2N706
Transistor 57—2N1486
Rectifier—10DB2A
Zener 55—5.6 v.
Zener 60—6.2 v.
Zener 61—12.6 v.
Relay 73—W102PCX
Diode 74—1N270
Capacitor 72—47 f.
Capacitor 54—1100 f.

Experiments using the constructed embodiment lasting as long as five days have been conducted in the production of algae cells such as *Chlorella pyrenoidosa*, bacteria cells such as *Escherichia coli*, *Chlorobium thiosulfatophilum*, and *Rhodospirillum rubrum*, mold cells such as yeast, and animal cells such as Hela cells. Constant turbidity was maintained, using the apparatus described above, at a level varying as little as ±0.02% O.D.

The apparatus of FIGURE 1 is shown diagrammatically and it will be understood that the sidewall of chamber 10 might be of stainless steel or other material so long as a window or windows were provided therein. Either light source or photocells might be contained within the chamber so long as one photocell views the source directly and the other views it through a portion of the cultured medium. Suitable protection capable of withstanding autoclaving, of course, would be necessary for any of the components in the chamber.

The control circuitry shown in FIGURE 2 may also be used to measure and control the mixing or maintaining of a constant turbidity or opaqueness in any mixture where a relatively translucent liquid is mixed with a more turbid or opaque liquid.

As will be apparent to those familiar with the art, the invention may be embodied in other specific forms without departing from the spirit or essential characteristics thereof. The embodiment disclosed is, therefore, to be considered in all respects as illustrative rather than restrictive, the scope of the invention being indicated by the appended claims.

What is claimed is:

1. In apparatus for growing living cells in a liquid medium, a growth chamber containing cells suspended in the medium therein and having at least a portion of its sidewalls transparent, means for continually agitating the medium in the chamber, a light source adjacent the chamber, a pair of matched photocells including a first photocell arranged to receive light directly from the source and a second photocell arranged to receive light from the source through a portion of the medium in the chamber, a fixed resistance and a variable resistance arranged in a Wheatstone bridge with the photocells, the bridge having one midpoint between the first photocell and the fixed resistance and the other midpoint between the second photocell and the variable resistance, a stylus and strip chart recorder having a potentiometer for operating its stylus, the potentiometer being operatively connected to the bridge midpoints, and a source of electric current operatively connected to the bridge for energizing the bridge, whereby changes in turbidity of the medium in the chamber are sensed by the second photocell and the consequent changes in voltage differential between the midpoints are recorded on the chart.

2. Apparatus defined in claim 1 in combination with means for automatically maintaining the turbidity of the medium in the chamber at a substantially constant level, comprising: a reservoir of medium for diluting the cultured medium in the chamber, conduit means leading from the reservoir to the chamber through a normally closed solenoid controlled valve, the chamber having overflow means, a voltage comparator having a reference input connected to the bridge midpoint between the first photocell and the fixed resistance and a measuring input connected to the other bridge midpoint, the comparator having an output which changes state when the voltages at the midpoints of the bridge are reversed from normal in their quantitative relation and delivers current, switch means responsive to current at the output to operate the solenoid controlled valve for opening the valve and diluting the cultured medium in the chamber until the voltages at the midpoints of the bridge are again reversed back to normal, and a source of electrical current operatively connected to the comparator for energizing the comparator.

3. Apparatus for growing living cells in a liquid medium and for automatically controlling the cell population density in the medium, comprising: a growth chamber containing cells suspended in the medium therein, at least a portion of the chamber walls being transparent, means for continuously agitating the medium in the chamber, a reservoir of medium for diluting the cultured medium in the chamber, conduit means leading from the reservoir to the chamber through a solenoid controlled valve, the chamber having overflow means and liquid level maintaining means connected to the overflow, a light source adjacent the chamber, a pair of matched photocells including a first photocell arranged to receive light directly from the source and a second photocell arranged to receive light from the source through a portion of the medium in the chamber, a fixed resistance and a variable resistance arranged in a Wheatstone bridge with the photocells, the bridge having a first midpoint between the first photocell and the fixed resistance and having a second midpoint between the second photocell and the variable resistance, a voltage comparator having a non-inverting input coupled to the first bridge midpoint and an inverting input coupled to the second bridge midpoint, the comparator having an output which is at substantially zero voltage when the inverting input is at a greater positive voltage than the non-inverting input and which output is positive when the inverting input is negative with respect to the non-inverting input, a transistor switch operable by the output when it is positive, the transistor switch being adapted to open the solenoid operated valve when the switch is operated, the solenoid operated valve being adapted to close when the transistor switch is not operated, and a source of electric current operatively connected to the bridge and comparator for energizing them, whereby cell growth in the chamber produces increased turbidity of the cultured medium and increased resistance in the second photocell to open the valve and dilute the cultured medium causing the chamber to overflow, and dilution ceases when the resistance of the second photocell is reduced because of the dilution of the medium in the chamber.

4. Apparatus as defined in claim 3 having a potentiometer operated, strip chart recorder to record changes in the turbidity in the chamber, the potentiometer of the recorder being operatively connected to the midpoints of the bridge.

5. Apparatus for controlling the opacity of a liquid mixture having one component of less opacity than the mixture, comprising: a container for the mixture having at least a portion of its sidewall transparent, a reservoir containing a dilution supply of the less opaque component, conduit means connecting the reservoir and container, an electrically operated normally closed valve in the conduit means, a light source adjacent the container, a first photocell arranged to view the light source directly, a second photocell arranged to view the source through a portion of the mixture, a fixed resistance and a variable resistance arranged in a Wheatstone bridge with the photocells, the bridge having a first midpoint between the first photocell and the fixed resistance and a second midpoint between the second photocell and the variable resistance, a voltage comparator having a non-inverting input coupled to the first midpoint and an inverting input coupled to the second midpoint, the comparator having an output which is at substantially zero voltage when the inverting input is at a greater positive voltage than the non-inverting input and which input is positive when the inverting input is negative with respect to the non-inverting input, switch means operable by the output when it is positive for opening the valve, and a source of electric current for energizing the bridge and the comparator, whereby, when the variable resistance is set so that the second midpoint is substantially at the voltage of the first midpoint, any increase in opacity of the mixture energizes the comparator output and causes dilution of the mixture.

References Cited

UNITED STATES PATENTS

| | | | |
|---|---|---|---|
| 2,843,756 | 7/1958 | Wise et al. | 250—210 |
| 2,872,588 | 2/1959 | Barton | 250—210 |
| 2,990,339 | 6/1961 | Frank et al. | 195—103.5 X |
| 3,172,235 | 3/1965 | Bjorklund | 47—1.4 |

WALTER STOLWEIN, Primary Examiner

U.S. Cl. X.R.

47—1.4; 195—103.5, 143; 250—210; 356—240